US012345686B2

(12) United States Patent
Hosoi et al.

(10) Patent No.: US 12,345,686 B2
(45) Date of Patent: Jul. 1, 2025

(54) FRACTURE TOUGHNESS TESTING MACHINE AND FRACTURE TOUGHNESS TEST METHOD

(71) Applicants: WASEDA UNIVERSITY, Tokyo (JP); KANAGAWA INSTITUTE OF INDUSTIAL SCIENCE AND TECHNOLOGY, Ebina (JP); JP STEEL PLANTECH CO., Yokohama (JP)

(72) Inventors: Atsushi Hosoi, Tokyo (JP); Hiroyuki Kawada, Tokyo (JP); Kazuki Harada, Tokyo (JP); Kristine Munk Jespersen, Kanagawa (JP)

(73) Assignees: WASEDA UNIVERSITY, Tokyo (JP); KANAGAWA INSTITUTE OF INDUSTRIAL SCIENCE AND TECHNOLOGY, Ebina (JP); JP STEEL PLANTECH CO., Yokohama (JP)

( * ) Notice: Subject to any disclaimer, the term of this patent is extended or adjusted under 35 U.S.C. 154(b) by 251 days.

(21) Appl. No.: 17/774,728

(22) PCT Filed: Nov. 13, 2020

(86) PCT No.: PCT/JP2020/042477
§ 371 (c)(1),
(2) Date: May 5, 2022

(87) PCT Pub. No.: WO2021/095863
PCT Pub. Date: May 20, 2021

(65) Prior Publication Data
US 2022/0397501 A1 Dec. 15, 2022

(30) Foreign Application Priority Data
Nov. 14, 2019 (JP) .................. 2019-205932

(51) Int. Cl.
*G01N 3/08* (2006.01)
*G01N 3/24* (2006.01)
*G01N 19/04* (2006.01)

(52) U.S. Cl.
CPC ................. *G01N 3/08* (2013.01); *G01N 3/24* (2013.01); *G01N 19/04* (2013.01);
(Continued)

(58) Field of Classification Search
CPC ............ G01N 3/08; G01N 3/24; G01N 19/04; G01N 2203/0017; G01N 2203/0066;
(Continued)

(56) References Cited

U.S. PATENT DOCUMENTS 4,075,886 A * 2/1978 Barker ..................... G01N 3/20
73/806
4,197,360 A * 4/1980 Throop ................. B32B 15/017
428/654

(Continued)

FOREIGN PATENT DOCUMENTS

JP 2007-147348 A 6/2007
JP 2015-87349 A 5/2015
(Continued)

OTHER PUBLICATIONS

Translation of KR2015005778.*
(Continued)

*Primary Examiner* — Helen C Kwok
(74) *Attorney, Agent, or Firm* — WHDA, LLP

(57) ABSTRACT

A fracture toughness testing machine evaluates fracture toughness of a specimen in pure mode. The testing machine includes: a testing-load applying device for applying a predetermined testing load to the specimen, in which the stresses are present; and a cancelling-load applying device for applying a cancelling load to the specimen to cancel the
(Continued)

stresses therein. The cancelling-load applying device includes: a pressing-force applying portion that applies a pressing force to the specimen as the canceling load; and a pressing-force determining portion that determines magnitude of the force. The pressing-force determining portion calculates the magnitude of the force using pre-stored equations so that an energy release rate related to in-plane shear mode crack deformation becomes zero.

6 Claims, 2 Drawing Sheets

(52) U.S. Cl.
CPC ............. *G01N 2203/0017* (2013.01); *G01N 2203/0066* (2013.01); *G01N 2203/0067* (2013.01)

(58) Field of Classification Search
CPC ... G01N 2203/0067; G01N 2203/0003; G01N 2203/0019; G01N 2203/0023; G01N 2203/0026; G01N 2203/006; G01N 2203/0075; G01N 2203/0091; G01N 2203/0282; G01N 2202/0605
See application file for complete search history.

(56) References Cited

U.S. PATENT DOCUMENTS

| | | | | |
|---|---|---|---|---|
| 4,926,694 A | * | 5/1990 | Crews, Jr. ............... | G01N 3/20 73/794 |
| 5,168,169 A | * | 12/1992 | Brewer, Jr. ............... | C22F 1/04 700/165 |
| 5,359,899 A | * | 11/1994 | Nishimura ............... | G01N 3/24 73/842 |
| 9,702,798 B1 | * | 7/2017 | Kim ......................... | G01N 3/42 |
| 2002/0066311 A1 | * | 6/2002 | Huston ..................... | G01N 3/04 73/159 |
| 2006/0021409 A1 | * | 2/2006 | Tenaglia ................... | G01N 3/62 219/121.85 |
| 2008/0202254 A1 | * | 8/2008 | Deng ....................... | G01N 3/04 73/827 |
| 2011/0214497 A1 | * | 9/2011 | Sellars .................... | G01N 19/04 73/150 A |
| 2015/0260636 A1 | * | 9/2015 | Ao ........................... | G01N 19/04 73/827 |
| 2016/0377518 A1 | * | 12/2016 | Puchnin .................. | G01B 7/003 73/12.09 |
| 2018/0154623 A1 | * | 6/2018 | Delconte ................. | B32B 37/12 |

FOREIGN PATENT DOCUMENTS

| | | | |
|---|---|---|---|
| KR | 20150025222 | * | 3/2015 |
| KR | 20150057778 | * | 5/2015 |
| WO | 2018/164212 A1 | | 9/2018 |

OTHER PUBLICATIONS

Translation of KR20150025222.*
International Search Report dated Jan. 19, 2021, issued in counterpart International Application No. PCT/JP2020/042477. (2 pages).
Yokozeki., "Energy Release Rate Associated with Interfacial Crack Growth of Laminates Including Residual Thermal Stresses: Application of Crack Tip Element Method", (2009), vol. 35, No. 3, pp. 99-105. Cited in Spec. (7 pages).
Nishiguchi et al., "Dissimilar Material Spot Joining Technique of Aluminum and CFRP", (2018), No. 35, pp. 95-100. Cited in ISR. (6 pages).

* cited by examiner

FRACTURE TOUGHNESS TESTING MACHINE AND FRACTURE TOUGHNESS TEST METHOD

TECHNICAL FIELD

The present invention relates to a fracture toughness testing machine for and a fracture toughness test method of evaluating fracture toughness at a bonded interface between dissimilar materials, and more specifically to a fracture toughness testing machine and a fracture toughness test method, with which it is made possible to evaluate fracture toughness in pure mode such that the effect of thermal residual stresses is removed.

BACKGROUND ART

In order to reduce the weight of bodies of air planes and automobiles, multi-material structures have been considered. The multi-material structures should be formed in a bonded structure without using bolts because fastening with bolts between the members made of dissimilar materials causes increase in weight. When members made of dissimilar materials having different thermal expansion coefficients are hot bonded, thermal residual stresses occur in the hot-bonded structure and cause a warp of the hot-bonded structure.

For the purpose of designing such a hot-bonded structure, it is desired to evaluate not only the bonding strength between the dissimilar materials but also fracture toughness, which is an index of crack propagation characteristics at the bonded interface between the materials. Conventionally, as test methods for evaluating the fracture toughness, various JIS test methods have been standardized in order to measure fracture toughness values (energy release rates), which are energy per area required for crack propagation in materials, as named in Patent Literature 1, for example. Such JIS test methods include the double cantilever beam test (DCB test) and the end notched flexure test (ENF test). The DCB test is a test concerning opening-mode crack deformation, called mode-I, which is performed in a state where a load is applied to open the crack in the vertical direction. The ENF test is a test concerning in-plane shear mode crack deformation, called mode-II, which is performed in a state where a load is applied along the direction of extension of the crack (longitudinal direction) from the tip end of the crack. Moreover, as disclosed in Patent Literature 1, for example, there is the mixed mode bending test (MMB test) for evaluating fracture toughness in a mixed mode of mode-I and mode-II.

In the case of the hot-bonded structure obtained by hot-bonding the dissimilar materials, a warp is caused owing to the thermal residual stresses as described above because of the difference in the thermal expansion coefficients of the materials and asymmetry. For this reason, Non-Patent Literature 1 discloses a correction method for the tests, such as the MMB test, the correction method including a formulation such that the fracture toughness value taking account of the thermal residual stresses is determined.

PRIOR ART LITERATURE

Patent Literature

Patent Literature 1: Japanese Unexamined Patent Application Publication No. 2007-147348 (JP2007-147348A)

Non-Patent Literature

Non-Patent Literature 1: Tomohiro Yokozeki, "Energy release rates of bi-material interface crack including residual thermal stresses: Application of crack tip element method," Journal of the Japan Society for Composite Materials, 2009, Vol. 35, No. 3, p. 99-105

SUMMARY OF INVENTION

Problems to be Solved by the Invention

However, with regard to the method disclosed in Non-Patent Literature 1, while it is possible to determine the total energy release rate, in which the thermal residual stresses in each of mode-I and mode-II are taken into account, it is impossible to evaluate the fracture toughness in pure mode such that the effect of the thermal residual stresses is removed and the load related only to the relevant mode is applied. There is a case where such fracture toughness in pure mode is required for design purposes as, for example, parameters for numerical simulations to estimate crack propagation. For this reason, the present inventors focused on the fact that the thermal residual stresses are related to the load of mode-II, the in-plane shear mode, and have found that it is possible to evaluate the pure mode fracture toughness at the bonded interface of a hot-bonded structure, in which thermal residual stresses are present, by performing the conventional fracture toughness test while applying a load in such a direction that the thermal residual stresses are cancelled.

The present invention has been made based on this finding and an object of the present invention is to provide a fracture toughness testing machine and a fracture toughness test method, with which it is made possible to evaluate fracture toughness of a specimen in pure mode such that the effect of thermal residual stresses is removed, when the thermal residual stresses are present in the specimen obtained by bonding dissimilar materials.

Means for Solving the Problem

In order to achieve the above object, a main aspect of the present invention is a testing machine for evaluating fracture toughness at a bonded interface of a specimen by applying a predetermined testing load to the specimen, the specimen being obtained by bonding a first member and a second member, which are made of dissimilar materials, in a state where a thermal residual stress is present therein, and having a crack formed at part of the interface between the members, the fracture toughness testing machine being characterized by including: testing-load applying means for applying the testing load to the specimen; and cancelling-load applying means for applying a cancelling load to the specimen so as to cancel the thermal residual stress.

Another main aspect of the present invention is a test method of evaluating fracture toughness at a bonded interface of a specimen by applying a predetermined testing load to the specimen, the specimen being obtained by bonding a first member and a second member, which are made of dissimilar materials, in a state where a thermal residual stress is present therein, and having a crack formed at part of the interface between the members, the fracture toughness test method being characterized by including applying the testing load to the specimen while applying a cancelling load for cancelling the effect of the thermal residual stress to the specimen.

Effects of the Invention

According to the present invention, it is made possible to evaluate fracture toughness of a specimen in pure mode such that the effect of thermal residual stresses in the specimen is removed, by performing the conventional fracture toughness test while applying a load for cancelling the thermal residual stresses.

EMBODIMENT FOR CARRYING OUT THE INVENTION

An embodiment of the present invention will be described below with reference to the drawings.

Figure 1:
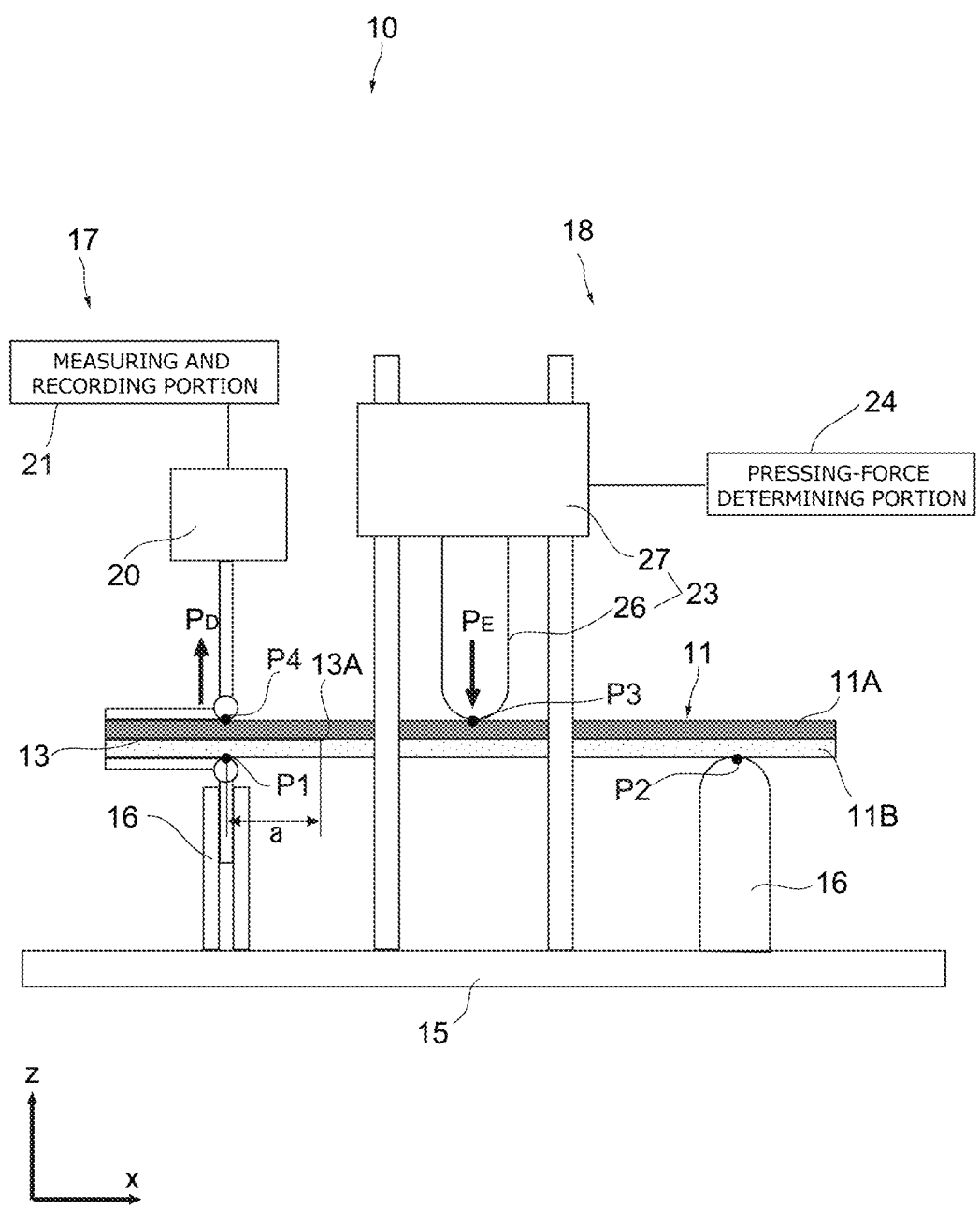
FIG. 1 is a schematic configuration diagram conceptually showing a fracture toughness testing machine according to an embodiment.

FIG. 1 is a schematic configuration diagram conceptually showing a fracture toughness testing machine according to this embodiment. In this figure, the fracture toughness testing machine 10 is configured so as to be able to perform a fracture toughness test in pure mode-I related to opening-mode crack deformation by applying a testing load to a specimen 11, in which thermal residual stresses are present, in the vertical direction of a crack 13 to open the crack 13 formed in part of the specimen 11 while applying a cancelling load for cancelling the thermal residual stresses to the specimen 11.

Figure 2:
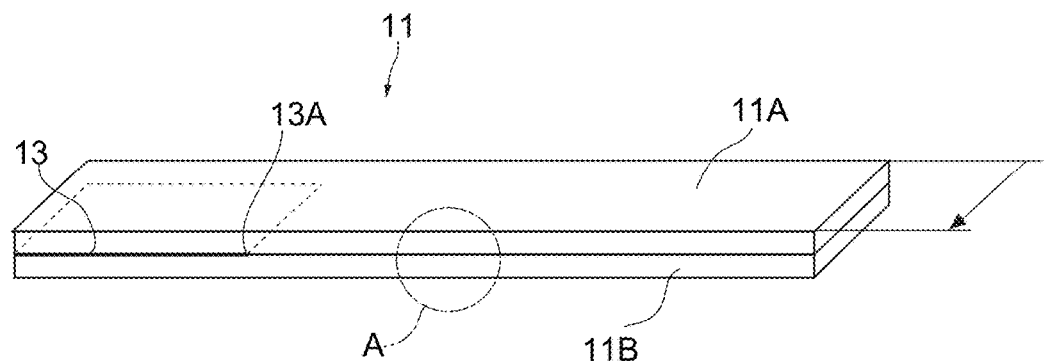
FIG. 2(A) is a schematic perspective view for explaining layered structure, dimension expressions, etc. of a specimen.
FIG. 2(B) is a partial enlarged view of part A of FIG. 2(A).
Figure 2:
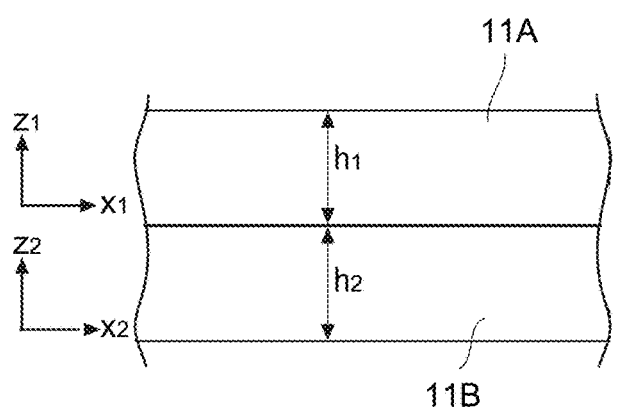

As shown in FIG. 2, a specimen obtained by bonding, while heating, two plates having a rectangular shape in plan view and made of dissimilar materials, first and second materials, is used as the specimen 11. Although not particularly limited, in this embodiment, aluminum is used as the first material and a carbon fiber-reinforced thermoplastic (CFRTP) is used as the second material. By vertically layering the plates made of the first and second materials and then bonding the plates by a hot press except for a partial area of the facing surfaces of the plates, the specimen 11 is formed, in which the partial area is the crack 13. Thus, the specimen 11 of this embodiment consists of a first layer 11A on the upper side in FIG. 2(A), which is made of aluminum, and a second layer 11B on the lower side in the same figure, which is made of CFRTP having a thermal expansion coefficient smaller than that of aluminum. In other words, the specimen 11 is formed by laying the first layer 11A on the upper side of the second layer 11B in FIG. 2, the first layer 11A having the thermal expansion coefficient higher than that of the second layer 11B. At part of the interface between the first layer 11A and the second layer 11B, the crack 13 is formed so as to extend from a left edge inward of the specimen 11 in FIG. 2(A), the crack 13 being the area, in which the first layer 11A and the second layer 11B are not bonded. Moreover, when the fracture toughness test is performed, the specimen 11 is in a state where there is a slight warp such that a center portion is convex downward in FIG. 2(A) owing to the thermal residual stresses caused by the bonding of the first and second materials having different thermal expansion coefficients. For the sake of simplicity, the specimen 11 is shown as a flat plate in the drawings.

As shown in FIG. 2 (A), the widths of the first layer 11A and the second layer 11B are denoted as width B, which is the same value, and as shown in FIG. 2 (B), with regard to the thickness, which is the height in the vertical direction (z-axis direction), the thickness of the layer 11A is denoted as thickness $h_1$ and the thickness of the layer 11B is denoted as thickness $h_2$, which all are the dimensions of the specimen 11 used for the calculation described below.

In the fracture toughness testing machine 10 of the present invention, the test is not limited to that using a specimen 11 of the material, shape, etc. of this embodiment. Specimens 11 made of various materials in various shapes, for example, can be used as long as a crack 13 is formed at part of the interface of plural materials having different thermal expansion coefficients and thermal residual stresses are present therein.

As shown in FIG. 1, the fracture toughness testing machine 10 includes: a base 15 having a plate shape, rectangular in plan view, which is installed on a predetermined installation surface; specimen supporting portions 16 that are fixed to the base 15 and support the specimen 11 from the lower side in FIG. 1 at left and right two points in the same figure; a testing-load applying means, or device, 17 that applies the testing load to the specimen 11; and a cancelling-load applying means, or device, 18 that applies the cancelling load to the specimen 11.

The specimen supporting portions 16 are configured so that the specimen 11 is placed on the specimen supporting portions 16 with the second layer 11B made of CFRTP positioned on the lower side in FIG. 1 when the test is performed. The specimen supporting portions 16 are shaped and constructed so as to be able to support the specimen 11 at left and right two supporting points P1 and P2 on the lower surface of the specimen 11 in the same figure.

The testing-load applying means 17 includes: a tensile-force applying portion 20 that applies a tensile force to the specimen 11 to pull the crack 13 in the vertical direction so as to open the crack 13 at a left end portion of the specimen 11 supported by the specimen supporting portion 16; and a measuring and recording portion 21 that measures and records the external force applied to the specimen 11. The tensile-force applying portion 20 and the measuring and recording portion 21 employ mechanisms equivalent to those of known testing machines, such as load cells, and explanation of the detailed configuration thereof is therefore omitted.

The cancelling-load applying means 18 includes: a pressing-force applying portion 23 that operates to apply a pressing force as a canceling load to the specimen 11; and a pressing-force determining portion 24 that determines the magnitude of the pressing force to be applied to the specimen 11 and causes the pressing-force applying portion 23 to operate.

The pressing-force applying portion 23 includes: a contacting tip 26 that contacts the upper surface of the specimen 11 in FIG. 1; and an actuator 27 that causes the contacting tip 26 to move in the vertical direction in FIG. 1.

The contacting tip 26 is positioned so as to be able to contact an application point P3 at the midpoint between the supporting points P1 and P2 in the lateral direction in FIG. 1, which is the longitudinal direction of the specimen 11. The contacting tip 26 is driven by the actuator 27 so as to press the surface of the first layer 11A, made of aluminum having the thermal expansion coefficient higher than that of CFRTP, at the application point P3 downward toward the second layer 11B side in FIG. 1.

Although not shown in the drawings, the actuator 27 includes an air cylinder and a fluid circuit that includes a compressor for driving the air cylinder and various valves, which is a publicly known configuration and detailed explanation thereof is therefore omitted. The actuator 27 is not limited to the air pressure driven device as in this embodiment. Various devices, in which a motor or an oil hydraulic cylinder, for example, is the driving power source, can be used as the actuator 27 as long as it functions as a driving power source that causes the contacting tip 26 to operate as described above.

The pressing-force determining portion 24 calculates a pressing force $P_E$ with the use of the pre-stored equations below. It is assumed here that the thermal residual stresses in the specimen 11 are related to the crack deformation of pure in-plane shear mode, mode-II. Thus, the pressing force $P_E$ to be applied to the application point P3 of the specimen 11 is calculated so that the mode-II energy release rate $G_{II}$, in which the thermal residual stresses in the specimen 11 are taken into account, becomes zero.

[Equation 1]

$$G_{II} = \frac{1}{2B}\left(c_1 + c_2 + \frac{h_1^2}{4}d_1 + \frac{h_2^2}{4}d_2\right)N_c^2 = 0 \quad (1)$$

$$N_c = \frac{2}{h_1\xi + 2\eta}\left\{-\left(\xi P_D + \frac{h_2 d_2}{2}\frac{P_E}{2}\right)a + (\alpha_2 - \alpha_1)\Delta T\right\} \quad (2)$$

$$\xi = \frac{h_1}{2}d_1 - \frac{h_2}{2}d_2 \quad \eta = c_1 + c_2 + \frac{h_2(h_1 + h_2)}{4}d_2 \quad (3)$$

$$c_i = \frac{U_i}{R_i U_i - S_i^2} \quad d_i = \frac{R_i}{R_i U_i - S_i^2} \quad (4)$$

$$R_i = B\int E_i dz_i \quad S_i = B\int E_i z_i dz_i \quad U_i = B\int E_i z_i^2 dz_i \quad (5)$$

In the above equations, B is the width of the specimen, $h_1$ is the thickness of the first layer 11A made of aluminum, $h_2$ is the thickness of the second layer 11B made of CFRTP, and a is the crack length corresponding to the length in the x-axis direction from a tip 13A of the crack 13 to an application point P4 of the testing load, as shown in FIG. 1; $\alpha_1$ is the thermal expansion coefficient of aluminum, which constitutes the first layer 11A, $\alpha_2$ is the thermal expansion coefficient of CFRTP, which constitutes the second layer 11B, and $\Delta T$ is the temperature difference between the operation temperature and the stress-free temperature, which all are determined as fixed values in advance. $P_D$ is the magnitude of the tensile force that is the testing load. Since the pressing force $P_E$ is determined in a state where the testing load is not applied, calculation is performed on the assumption that $P_D=0$. With regard to the letters (E, R, S, U, c, d) in the above equations (3), (4), and (5) and the thickness-direction z-axis in the coordinate system set for each of the layers 11A and 11B, the subscript i is such that the first layer 11A is denoted by i=1 and the second layer 11B is denoted by i=2. Note that Ei is the in-plane Young's modulus of each of the layers 11A and 11B. Since the materials of the layers 11A and 11B are specified, these are fixed values.

Next, the test method using the fracture toughness testing machine 10 will be described.

First, the specimen 11 having the crack 13 is prepared that is obtained by hot-bonding dissimilar materials and is therefore in a state where thermal residual stresses are present therein. Next, the pressing force $P_E$, which is the cancelling load for cancelling the thermal residual stresses, is calculated by the pressing-force determining portion 24 in a state where the tensile force, which is the testing load, is not applied to the specimen 11. The pre-set values corresponding to properties of the first layer 11A and the second layer 11B, such as material properties and sizes thereof, are substituted into the pre-stored equations (1) to (5) to calculate the pressing force $P_E$. Either before or after this calculation, the specimen 11 is placed on the specimen supporting portions 16 with the first layer 11A having the higher thermal expansion coefficient positioned on the upper side in FIG. 1. Thereafter, the test is performed by applying a constant pressing force $P_E$ to the specimen 11 and changing the magnitude of the tensile force $P_D$ that is the testing load. In this process, the state of opening and propagation of the crack 13 is monitored by a camera, a clip gauge, etc., which are not shown in the figure, and, based on the magnitude of each tensile force $P_D$, the measuring and recording portion 21 performs evaluation of the fracture toughness of the specimen related to the tensile force $P_D$ by calculating the fracture toughness value, for example.

Note that various configurations can be adopted for the fracture toughness testing machine 10 as long as the fracture toughness testing machine 10 can cancel the thermal residual stresses in the specimen by applying a pressing force to the specimen 11, obtained by bonding dissimilar materials, in a direction from the member made of the material with the higher thermal expansion coefficient toward the member made of the material with the lower thermal expansion coefficient.

In addition, in the above embodiment, the thermal residual stresses in the specimen 11 are cancelled to make it possible to obtain the data on fracture toughness in pure mode-I. However, the present invention is not limited this embodiment. The testing-load applying means 17 may be configured so as to apply to the specimen 11 the testing load related to another mode, such as in-plane shear mode and out-of-plane shear mode, by changing direction and/or location, for example, of application of the testing load with respect to the specimen 11. This makes it possible to acquire data in pure mode, in which the thermal residual stresses in the specimen 11 for the mode are cancelled.

The configuration of each part of the machine of the present invention is not limited to the example shown in the figure, but can be changed in various ways as long as it brings about substantially the same operations.

DESCRIPTION OF REFERENCE NUMERALS 10 fracture toughness testing machine
11 specimen
13 crack
17 testing-load applying means
18 cancelling-load applying means
23 pressing-force applying portion
24 pressing-force determining portion

The invention claimed is:
1. A testing machine for evaluating fracture toughness at a bonded interface of a specimen by applying a predetermined testing load to the specimen, the specimen being obtained by bonding a first member and a second member, which are made of dissimilar materials, in a state where a thermal residual stress is present therein, and having a crack formed at part of the interface between the members, the fracture toughness testing machine comprising:
  a base;
  specimen supporting portions fixed to the base;
  a testing-load applying device that is a tensile force applying portion configured to apply a tensile force as the predetermined testing load to the specimen so as to open the crack; and
  a cancelling-load applying device for applying a cancelling load to the specimen, including: a pressing-force applying portion that is configured to operate so as to apply a pressing force with a constant magnitude to the specimen as the cancelling load; and a pressing-force determining portion that is configured to determine the constant magnitude of the pressing force by calculating the constant magnitude of the pressing force with the use of pre-stored equations so that an energy release rate related to in-plane shear mode crack deformation becomes zero, corresponding to $G_{II}$=0, whereby the cancelling-load applying device is configured to apply the cancelling load to the specimen so as to cancel the thermal residual stress, wherein the specimen supporting portions are configured to support two end portions of the specimen, one of the specimen supporting portions is disposed at one of the two end portions of the specimen where the testing-load applying device applies the predetermined testing load to the specimen, and the predetermined testing load to the specimen is changeable with respect to the constant magnitude of the pressing force, and the equations are following equations (1) to (5):

$$G_{II} = \frac{1}{2B}\left(c_1 + c_2 + \frac{h_1^2}{4}d_1 + \frac{h_2^2}{4}d_2\right)N_c^2 = 0 \quad (1)$$

$$N_c = \frac{2}{h_1\xi + 2\eta}\left\{-\left(\xi P_D + \frac{h_2 d_2}{2}\frac{P_E}{2}\right)a + (\alpha_2 - \alpha_1)\Delta T\right\} \quad (2)$$

$$\xi = \frac{h_1}{2}d_1 - \frac{h_2}{2}d_2 \quad \eta = c_1 + c_2 + \frac{h_2(h_1 + h_2)}{4}d_2 \quad (3)$$

$$c_i = \frac{U_i}{R_i U_i - S_i^2} \quad d_i = \frac{R_i}{R_i U_i - S_i^2} \quad (4)$$

$$R_i = B\int E_i dz_i \quad S_i = B\int E_i z_i dz_i \quad U_i = B\int E_i z_i^2 dz_i \quad (5)$$

$G_{II}$: energy release rate related to crack deformation of in-plane shear mode
B: width of the specimen
$h_1$: thickness of the first member
$h_2$: thickness of the second member
a: length of the crack
$\alpha_1$: thermal expansion coefficient of material of the first member
$\alpha_2$: thermal expansion coefficient of material of the second member
$\Delta T$: temperature difference between operation temperature and stress-free temperature
$P_D$: tensile force (the testing load)
$P_E$: pressing force (the cancelling load)
$z_1$: coordinate in thickness direction set for the first member
$z_2$: coordinate in thickness direction set for the second member
$E_1$: in-plane Young's modulus of the first member
$E_2$: in-plane Young's modulus of the second member
i: subscript (1: the first member, 2: the second member).

2. The fracture toughness testing machine according to claim 1, wherein
the pressing-force applying portion is configured to apply the pressing force in a direction from the member with a higher thermal expansion coefficient, which is one of the first and second members, to the member with a lower thermal expansion coefficient.

3. The fracture toughness testing machine according to claim 1, wherein
the testing-load applying device is configured to apply to the specimen the tensile force as the predetermined testing load to pull the specimen in a vertical direction of the crack so as to open the crack, so that a test is performed in pure mode related only to opening-mode crack deformation.

4. A test method of evaluating fracture toughness at a bonded interface of a specimen by applying a predetermined testing load to the specimen, the fracture toughness test method comprising:

providing the specimen and placing the specimen on specimen supporting portions fixed to a base of a fracture toughness testing machine, wherein the specimen being obtained by bonding a first member and a second member, which are made of dissimilar materials, in a state where a thermal residual stress is present therein, and having a crack formed at part of the interface between the members; and applying a tensile force as the predetermined testing load to the specimen so as to open the crack while applying a pressing force with a constant magnitude as a cancelling load for cancelling effect of the thermal residual stress to the specimen, wherein the constant magnitude of the cancelling load is calculated with the use of predetermined equations so that an energy release rate related to in-plane shear mode crack deformation becomes zero, corresponding to $G_{II}$=0, whereby the cancelling load is applied to the specimen so as to cancel the thermal residual stress, wherein the equations are following equations (1) to (5):

$$G_{II} = \frac{1}{2B}\left(c_1 + c_2 + \frac{h_1^2}{4}d_1 + \frac{h_2^2}{4}d_2\right)N_c^2 = 0 \quad (1)$$

$$N_c = \frac{2}{h_1\xi + 2\eta}\left\{-\left(\xi P_D + \frac{h_2 d_2}{2}\frac{P_E}{2}\right)a + (\alpha_2 - \alpha_1)\Delta T\right\} \quad (2)$$

$$\xi = \frac{h_1}{2}d_1 - \frac{h_2}{2}d_2 \quad \eta = c_1 + c_2 + \frac{h_2(h_1 + h_2)}{4}d_2 \quad (3)$$

$$c_i = \frac{U_i}{R_i U_i - S_i^2} \quad d_i = \frac{R_i}{R_i U_i - S_i^2} \quad (4)$$

$$R_i = B\int E_i dz_i \quad S_i = B\int E_i z_i dz_i \quad U_i = B\int E_i z_i^2 dz_i \quad (5)$$

$G_{II}$: energy release rate related to crack deformation of in-plane shear mode
B: width of the specimen
$h_1$: thickness of the first member
$h_2$: thickness of the second member
a: length of the crack
$\alpha_1$: thermal expansion coefficient of material of the first member
$\alpha_2$: thermal expansion coefficient of material of the second member
$\Delta T$: temperature difference between operation temperature and stress-free temperature
$P_D$: tensile force (the testing load)
$P_E$: pressing force (the cancelling load)
$z_1$: coordinate in thickness direction set for the first member
$z_2$: coordinate in thickness direction set for the second member
$E_1$: in-plane Young's modulus of the first member
$E_2$: in-plane Young's modulus of the second member
i: subscript (1: the first member, 2: the second member).

5. The fracture toughness test method according to claim 4, wherein the pressing force is applied as the cancelling load in a direction from the member with a higher thermal expansion coefficient, which is one of the first and second members, to the member with a lower thermal expansion coefficient.

6. The fracture toughness test method according to claim 4 wherein the tensile force to pull the specimen in a vertical direction of the crack so as to open the crack is applied to the specimen, so that a test is performed in pure mode related only to opening-mode crack deformation.

* * * * *